US007185163B1

(12) United States Patent
Knight et al.

(10) Patent No.: US 7,185,163 B1
(45) Date of Patent: Feb. 27, 2007

(54) BALANCING MOST FREQUENTLY USED FILE SYSTEM CLUSTERS ACROSS A PLURALITY OF DISKS

(75) Inventors: Margaret E. Knight, Seattle, WA (US); Rufeng Li, Seattle, WA (US)

(73) Assignee: Veritas Operating Corporation, Cupertino, CA (US)

( * ) Notice: Subject to any disclaimer, the term of this patent is extended or adjusted under 35 U.S.C. 154(b) by 472 days.

(21) Appl. No.: 10/653,751

(22) Filed: Sep. 3, 2003

(51) Int. Cl.
*G06F 12/00* (2006.01)

(52) U.S. Cl. ..................................... 711/165
(58) Field of Classification Search ................ 711/114, 711/165
See application file for complete search history.

(56) References Cited

U.S. PATENT DOCUMENTS 5,724,552 A * 3/1998 Taoda ......................... 711/165
5,893,139 A * 4/1999 Kamiyama .................. 711/117
6,314,526 B1 11/2001 Arendt et al.
6,427,163 B1 7/2002 Arendt et al.
6,430,618 B1 8/2002 Karger et al.
6,912,635 B2 * 6/2005 Patterson et al. ........... 711/165
6,990,667 B2 * 1/2006 Ulrich et al. ............... 718/105
2003/0126252 A1* 7/2003 Abir ........................... 709/223

* cited by examiner

*Primary Examiner*—Hiep T. Nguyen
(74) *Attorney, Agent, or Firm*—Meyertons Hood Kivlin Kowert & Goetzel, P.C.; Jeffrey C. Hood; Jason L. Burgess (57) ABSTRACT

A system and method for balancing input/output load for a plurality of storage devices, such as a plurality of disks. According to one embodiment of the method, accesses (e.g., read and/or write accesses) to chunks located on the storage devices may be monitored, where each chunk comprises one or more file system clusters. Data indicating a number of accesses to each chunk may be stored, and a list of most frequently used chunks may be determined based on the data. The most frequently used chunks may then be balanced across the plurality of storage devices.

29 Claims, 5 Drawing Sheets

BALANCING MOST FREQUENTLY USED FILE SYSTEM CLUSTERS ACROSS A PLURALITY OF DISKS

BACKGROUND

1. Field of the Invention

This invention relates to computer storage systems, and more particularly to a system and method for balancing the most frequently used file system clusters across a plurality of physical disks or other storage devices.

2. Description of the Related Art

Computer systems generally store data on storage devices such as disk drives by dividing the data into blocks referred to as clusters. A cluster is the minimum allocation unit utilized by a file system. Cluster sizes vary on different systems; typical cluster sizes range from 512 bytes to 4 KB, although larger or smaller cluster sizes can also be used.

Many computer systems utilize storage systems that include multiple physical disks. For example, large organizations often utilize volume manager products that allow administrators to organize physical disk space into independent logical volumes that span multiple physical disks. Data located in these volumes is accessed through a file system, database, or other applications.

Within any given volume, there is typically a subset of clusters that are accessed more frequently than other clusters. The manner in which the most frequently used clusters are distributed across the physical disks can affect the efficiency of data access. For example, if many frequently used clusters are located on a single disk, access speed for these clusters may be slowed since the disk cannot physically access all of these clusters simultaneously. Efficiency of data access is a very important factor affecting the performance of an organization's servers, databases, and other software applications.

SUMMARY OF THE INVENTION

One embodiment of the invention relates to a system and method for balancing input/output load for a plurality of storage devices, such as a plurality of disks. According to one embodiment of the method, accesses (e.g., read and/or write accesses) to chunks located on the storage devices may be monitored. As used herein, the term "chunk" refers to a portion of data that comprises one or more file system clusters. The size of a chunk may be a multiple of the cluster size. Data indicating a number of accesses to each chunk may be stored, and a list of most frequently used chunks may be determined based on the data. The most frequently used chunks may then be balanced across the plurality of storage devices.

In one embodiment, one or more volumes may be stored on the plurality of storage devices. Thus, monitoring accesses to chunks located on the storage devices may comprise, for each volume, monitoring accesses to chunks located in the volume. Access statistics for chunks located in one or more of the volumes may be considered when balancing most frequently used chunks across the plurality of storage devices.

In one embodiment, a graphical user interface for setting properties of the monitoring may be displayed. User input may be received to the graphical user interface to specify one or more properties of the monitoring. The monitoring of the accesses to chunks located on the storage devices may be performed in accordance with the specified one or more properties.

In one embodiment, the monitoring of accesses to chunks located on the storage devices and the balancing of most frequently used chunks across the plurality of storage devices may be performed repeatedly at periodic intervals. For example, the most frequently used chunks may be determined based on access statistics from a particular monitoring period, and the most frequently used chunks may be balanced after each monitoring period.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
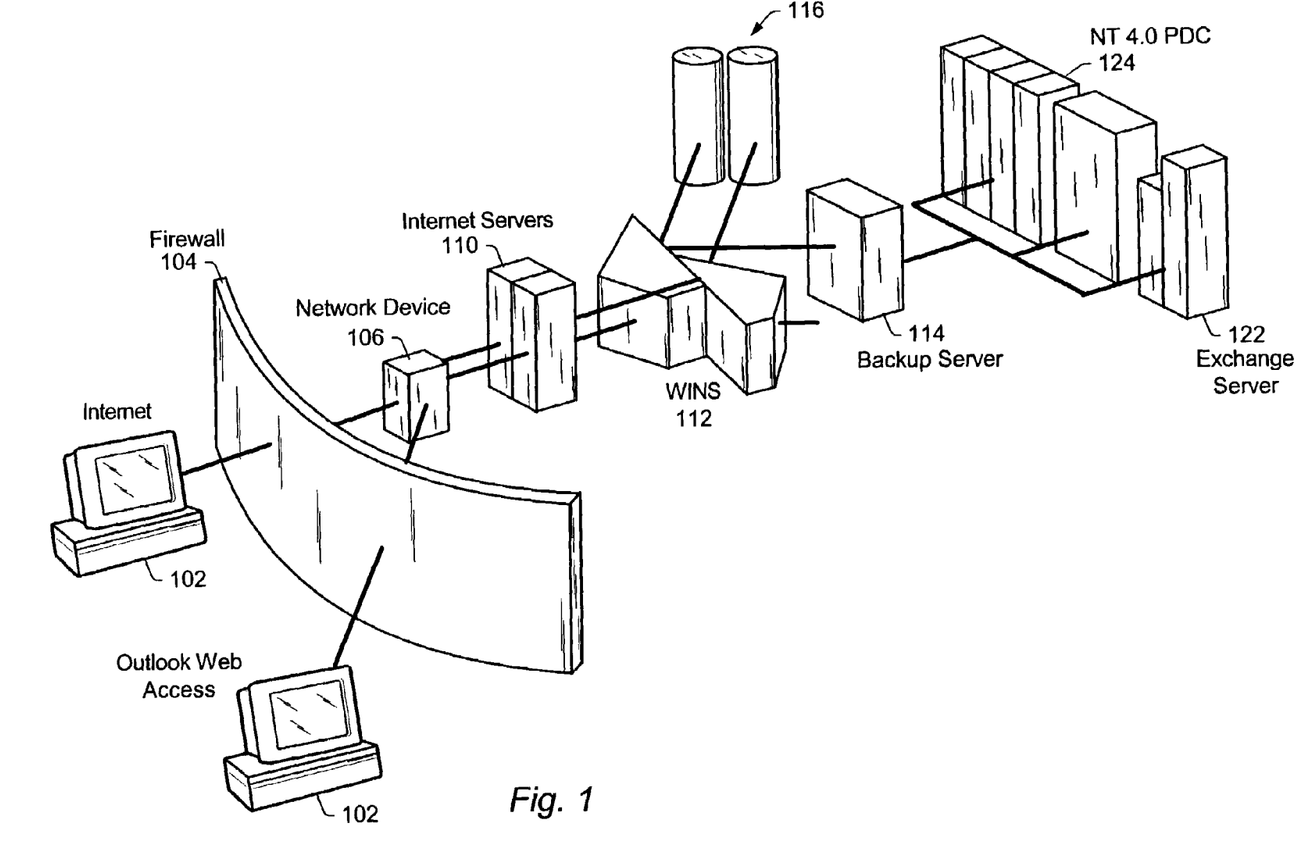
FIG. 1 illustrates an exemplary network system according to one embodiment.

FIG. 1—Exemplary Network System

Embodiments of the invention may be utilized in any of various types of systems that utilize storage devices such as disk drives, including network or enterprise systems. FIG. 1 illustrates one example of a network system. The network system may comprise a local area network (LAN), two or more interconnected local area networks, or a wide area network (WAN) comprising two or more distributed LANs coupled together, such as by the Internet, among other possible configurations.

As shown, the network system may include one or more client computer systems 102. The client computer systems 102 may store and/or execute various applications, one example being an electronic mail (email) or electronic contact/scheduling client program, such as Microsoft Outlook. The client computer systems 102 may execute other applications, such as programs for Internet access, database programs, and others. The one or more client computer systems 102 may be connected through a firewall 104 to a network device 106, such as a router, hub, or bridge. The client computer systems 102 may couple through the firewall 104 and/or network device 106 to one or more Internet servers 110. The Internet servers 110 may be connected to various other computer systems and/or storage devices, such as a WINS server 112, a backup server 114, and/or a storage area network (SAN) 116. These servers may in turn be connected to other servers which host other applications, such as Microsoft Exchange server 122 or an NT 4.0 PDC (Primary Domain Controller) 124, among others.

One or more of the devices or computer systems shown in FIG. 1 may include a plurality of storage devices on which data is stored, such as a plurality of disks. As one example, the Exchange server 122 may include a plurality of disks which store mailbox data for various users, as well as other data utilized by the Microsoft Exchange application. In other embodiments, any of various other types of computer systems may utilize a plurality of disks for storing any of various kinds of data. For example, a database server may utilize a plurality of disks to store one or more SQL databases.

As described above, the data on each of the plurality of disks may be divided into file system clusters. In one embodiment, the disks may be organized into logical volumes. Each volume may be located on a single disk or may span multiple disks. For example, a first application may utilize data that is stored in a first volume, where the first volume spans a first disk, a second disk, and a third disk. (In various embodiments, a volume may span any number of disks.) Thus, as the first application utilizes the data stored in the first volume, the first disk, the second disk, and the third disk may each access file system clusters associated with the first application, e.g., may read from and/or write to these file system clusters in response to requests from the first application.

As described above, the frequency with which different file system clusters are accessed can vary. Thus, the network system may utilize one or more computer programs that operate to automatically balance the most frequently used file system clusters across the plurality of disks. In various applications, balancing the most frequently used file system clusters across the disks in this manner may increase the efficiency of data access for an application, e.g., by helping to balance input/output load across the disks.

In various embodiments, the computer program(s) that operate to automatically balance the most frequently used file system clusters may be stored in various locations, such as on a memory medium of a server computer, e.g., one of the server computers illustrated in FIG. 1. These computer program(s) may also execute on any of various computer systems. For example, in one embodiment, the Exchange server 122 may execute the computer program(s) to balance most frequently used file system clusters across one or more disks. In another embodiment, a computer system dedicated to performing data storage may execute the computer program(s) to balance most frequently used file system clusters across one or more disks. It is noted that these are examples only, and in other embodiments, any of various kinds of computer systems may execute the program(s) to balance most frequently used file system clusters across a plurality of disks or other storage devices.

The term "memory medium" is intended to include any of various types of memory devices for storing programs and/or data. For example, the term "memory medium" is intended to include an installation medium, e.g., a CD-ROM, floppy disks 104, or tape device; a computer system memory or random access memory such as DRAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

The computer program(s) which implement the balancing of the most frequently used file system clusters may be stored in a memory medium of one of the computers shown in FIG. 1, or in a memory medium of another computer, and may be executed by one or more CPUs. One or more CPUs executing code and data from one or more memory mediums thus may comprise a means for performing the methods described herein. For example, a CPU executing code and data from a memory medium may comprise a means for balancing most frequently used file system clusters across a plurality of disks according to the methods described below.

In general, the term computer system as used herein is defined to encompass any device having a processor which executes instructions from a memory medium. In different embodiments, a "computer system" may take various forms, including a personal computer system, desktop computer, mainframe computer system, server computer system, another suitable device, or combinations thereof. A computer system may be attached to a network as part of a distributed computing environment.

Figure 2:
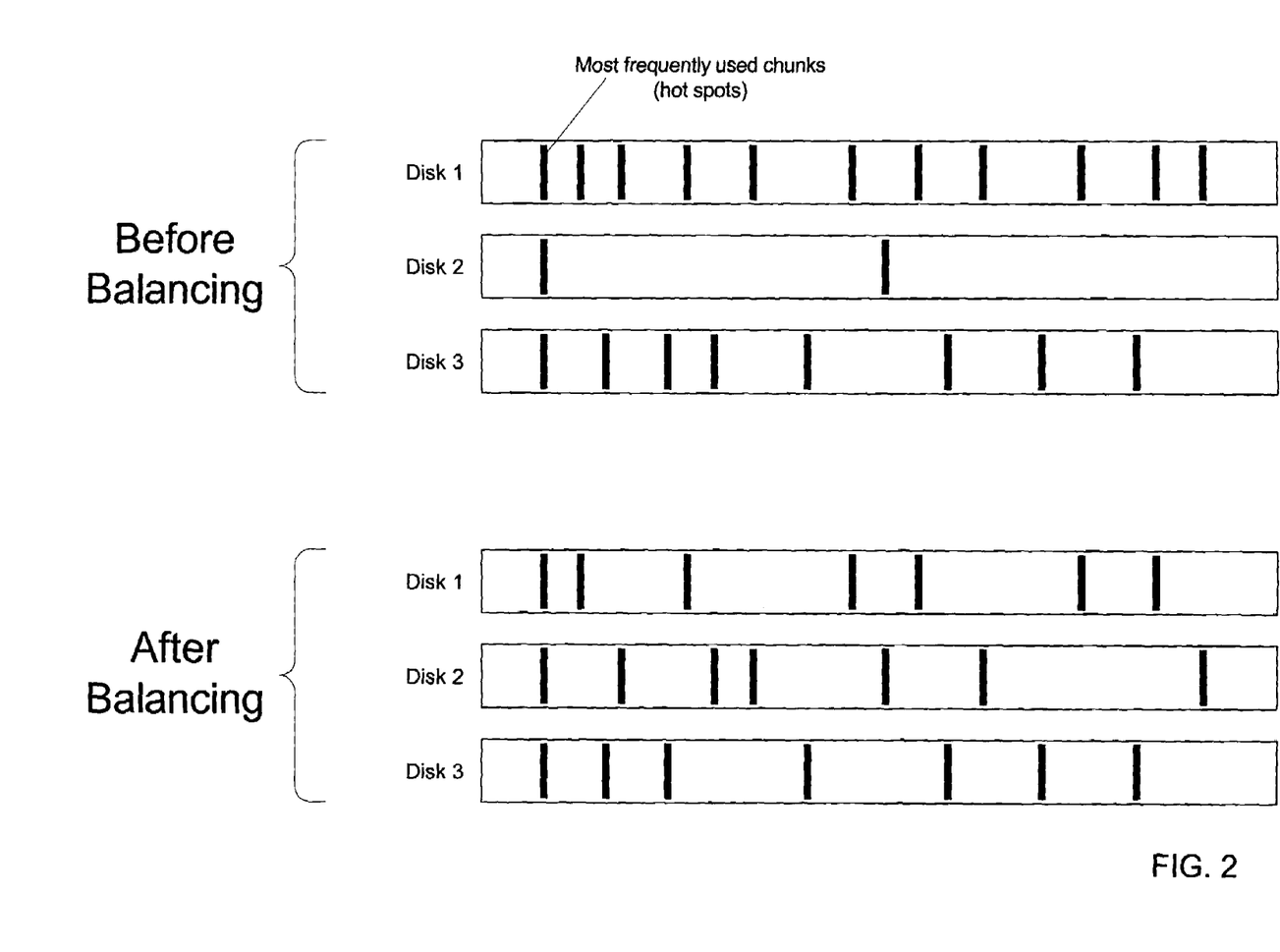
FIG. 2 is a diagram illustrating the concept described herein of balancing most frequently used file system clusters across a plurality of disks or other storage devices.

FIG. 2—Exemplary Balanced and Unbalanced Disks

FIG. 2 is a diagram illustrating the concept described herein of balancing most frequently used file system clusters across a plurality of disks or other storage devices. In this example, storage space on three different disks (Disk 1, Disk 2, and Disk 3) is illustrated. However, in other embodiments most frequently used file system clusters may be balanced across other kinds of storage devices besides disks, and the number of storage devices may vary.

Each dark vertical line shown on a disk represents a most frequently used chunk, which is also referred to herein as a "hot spot". As used herein, the term "chunk" refers to a portion of data that comprises one or more file system clusters. The size of a chunk may be a multiple of the cluster size. In one embodiment, data access may be monitored at the granularity level of a chunk, and a list of most frequently used chunks may be utilized to balance hot spots across the disks. It is noted that data access may also be monitored and hot spots may be balanced at the granularity level of a single file system cluster. (This is the case when each chunk comprises only one cluster and the chunk size is the same as the cluster size.) As described below, in one embodiment the chunk size may be configurable to allow monitoring and balancing to be performed at the level of granularity desired by the system administrator. In one embodiment, the size of a chunk is less than the size of a typical volume. Thus, data may be monitored and balanced on a relatively small scale in comparison with the size of a volume.

Referring again to FIG. 2, the top of the diagram illustrates the three disks before the most frequently used chunks have been balanced. As shown, Disk 1 has 11 most frequently used chunks, Disk 2 has 2 most frequently used chunks, and Disk 3 has 8 most frequently used chunks. In one embodiment, a hot spot weight may be computed for each disk as a measure of the proportion or weight of most frequently used chunks stored by the disk. For example, the hot spot weight may be based on the total number of input/output accesses of all most frequently used chunks on the disk over a particular monitoring period, as described below. A disk that has a greater hot spot weight than the average for all disks is referred to herein as a heavy disk. Similarly, a disk that has a smaller hot spot weight than the average for all disks is referred to herein as a light disk.

Thus, in the example of FIG. 2, Disks 1 and 3 are heavy disks, and Disk 2 is a light disk.

Most frequently used chunks may be balanced across the disks by moving some of the most frequently used chunks located on heavy disks to light disks. The bottom portion of FIG. 2 illustrates an example of how the most frequently used chunks may be distributed among the disks after a balancing technique has been performed. In this example, 4 most frequently used chunks have been relocated from Disk 1 to Disk 2, and 1 most frequently used chunk has been relocated from Disk 3 to Disk 2. Thus, each disk stores 7 most frequently used chunks after the balancing technique has been performed.

In one embodiment, disk geometry may be taken into account when moving chunks or clusters. For example, most frequently used chunks may not only be moved from heavy disks to light disks, but may also be moved to optimal locations on the lights disks. For example, many disks are able to access clusters located near the center of the physical disk platter faster than they are able to access clusters located further away from the center. Thus, in one embodiment one or more most frequently used chunks may be moved from a heavy disk to an optimal location on a light disk, e.g., to a position near the center of the light disk.

In various embodiments, various criteria may be utilized to determine which chunks qualify as most frequently used chunks. In one embodiment, the number of times that each chunk is accessed may be tracked over a particular monitoring period, and the most frequently used chunks may be determined based on the access numbers. For example, in one embodiment, the N most frequently accessed chunks during the monitoring period may be designated as the most frequently used chunks. As described below, in one embodiment a system administrator may specify the number of chunks to be designated as most frequently used chunks, i.e., may specify the value of N. In another embodiment, a particular percentage of chunks may be designated as most frequently used chunks instead of a particular number N. In one embodiment, a system administrator may specify the desired percentage of chunks to be designated as most frequently used chunks.

In another embodiment, the most frequently used chunks may be computed based on a function of their access numbers during the monitoring period versus access numbers for other chunks, e.g., versus the average access number for all chunks. In this case, for example, the access number for the chunk may need to be some percentage X larger than the average access number in order for the chunk to qualify as a most frequently used chunk. Thus, the number of most frequently used chunks may vary depending on the access statistics for a given monitoring period.

In various embodiments, the most frequently used chunks may be determined based on input/output access during the monitoring period in various ways. The determination may be based on read accesses, write accesses, or both. For example, in one embodiment the chunks that receive the greatest access totals (the sum of both read accesses and write accesses) may be designated as the most frequently used chunks. In another embodiment, write accesses may be given a greater weight than read accesses in determining the most frequently used chunks, or read accesses may be given a greater weight than write accesses. In another embodiment, only write accesses or only read accesses may be considered in determining the most frequently used chunks.

Since the most frequently used chunks may be computed based on access statistics during a given monitoring period, the chunks that are designated as the most frequently used chunks may change over time. In one embodiment, a method may be utilized to monitor access statistics for each chunk for a particular monitoring period, determine a subset of the chunks to be designated as the most frequently used chunks based on the access statistics, and then balance the most frequently used chunks across the plurality of disks. The method may perform these tasks periodically so that the most frequently used chunks are continually re-balanced as access patterns change over time.

Figure 3:
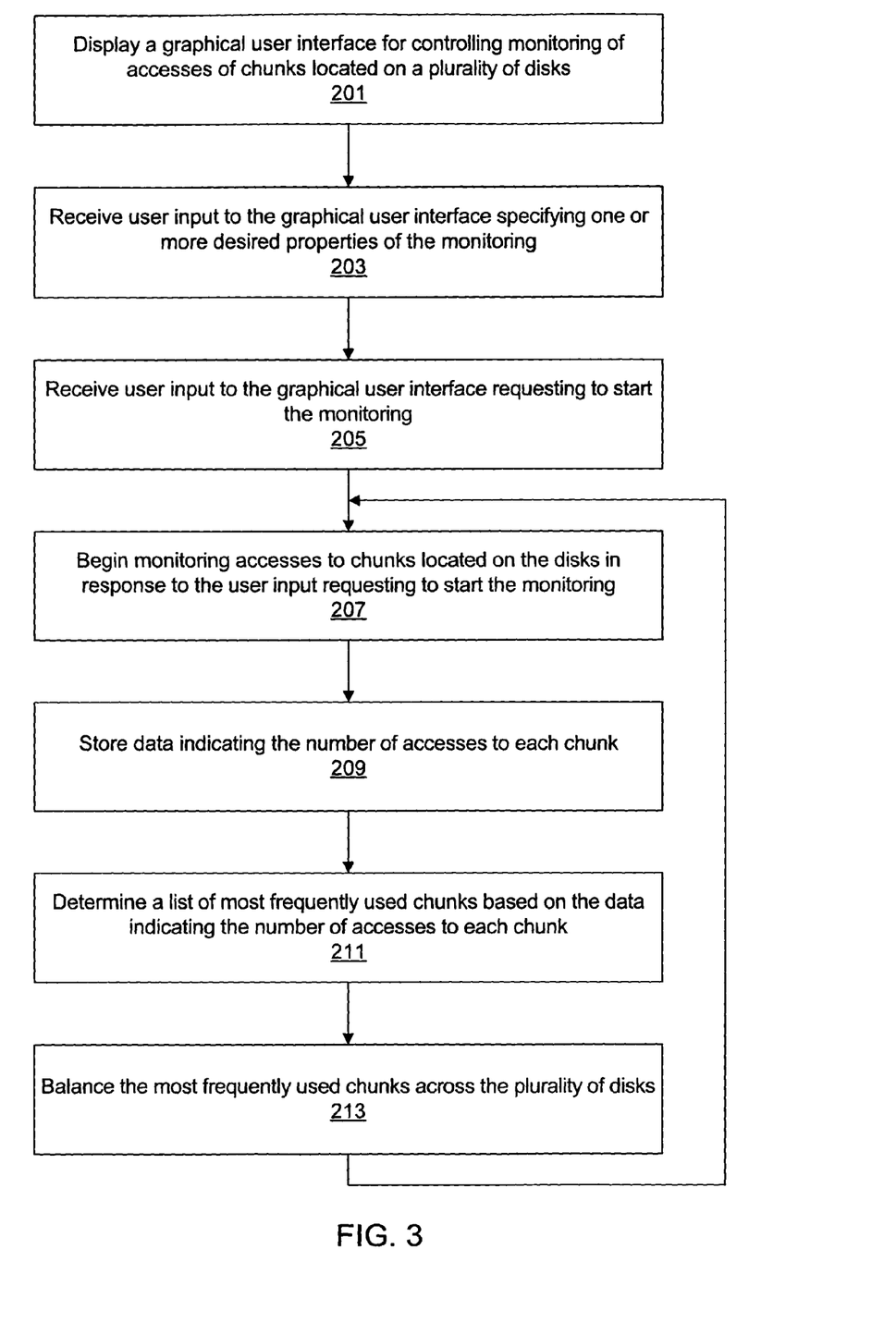
FIG. 3 is a flowchart diagram illustrating one embodiment of a method for balancing most frequently used chunks across a plurality of storage devices.

FIG. 3—Method for Balancing Most Frequently Used Chunks

FIG. 3 is a flowchart diagram illustrating one embodiment of a method for balancing most frequently used chunks across a plurality of disks or other storage devices. It is noted that FIG. 3 illustrates a representative embodiment, and alternative embodiments are contemplated. Also, various elements may be combined, omitted, or performed in different orders.

As described above, the most frequently used chunks located on the plurality of disks may be determined based on access statistics for the chunks. Thus, read and/or write accesses to chunks may be automatically monitored to obtain these access statistics. In 201, a graphical user interface (GUI) for controlling the monitoring may be displayed. The GUI may display various user interface elements with which the user (e.g., system administrator) can interact to specify one or more desired properties of the monitoring.

In 203, user input specifying one or more desired properties of the monitoring may be received to the graphical user interface. In various embodiments, any of various properties of the monitoring may be specified. For example, in one embodiment the user may specify a chunk size. As noted above, a chunk may comprise one or more file system clusters, and the chunk size may be a multiple of the cluster size. Thus the user may specify the chunk size by specifying a number of bytes in each chunk (e.g., 512, 1024, etc.) or by specifying the number of clusters in each chunk. This chunk size may be used to determine which chunk(s) each input/output request relates to. Thus, the chunk size may be used to control the level of granularity for monitoring and balancing the most frequently used file system clusters. In one embodiment, the size of a chunk is less than the size of a typical volume. Thus, data may be monitored and balanced on a relatively small scale in comparison with the size of a volume.

In one embodiment the user may also specify properties affecting the number of chunks to consider as most frequently used chunks. For example, the user may specify a list size N for a list of most frequently used chunks. Thus, the N most frequently accessed chunks during the monitoring period may be designated as the most frequently used chunks, as described above. In other embodiments, the user may specify properties affecting the number of most frequently used chunks in other ways, e.g., by specifying a particular percentage of chunks to designate as most frequently used chunks, by specifying a mathematical relationship of the access statistics for the most frequently used chunks versus other chunks, etc., as described above.

In one embodiment, the user may also specify properties affecting timing of the monitoring and/or balancing. For example, the user may specify a monitoring period, i.e., a time period over which access statistics for chunks stored on the plurality of disks are to be monitored. The user may also specify a time interval such that a new monitoring period begins at intervals specified by the time interval.

In 205, user input requesting to start monitoring accesses to chunks located on the plurality of disks may be received to the graphical user interface. For example, the user may click a button, select a menu item, or provide other input requesting to start the monitoring. Thus, monitoring of chunk accesses may begin in response to this request, as indicated in 207.

In various embodiments, any of various techniques may be utilized to monitor the chunk accesses. In one embodiment, input/output requests (i.e., read requests and/or write requests) for each chunk may be intercepted by a software program or software component. For example, in one embodiment a program such as the Hot Spot Driver 310 described below may be operable to intercept or filter input/output requests for each chunk.

As shown in 209, data indicating the number and/or type of accesses to each chunk may be stored. In various embodiments, any of various kinds of data structures may be utilized to store the data indicating the number of accesses to each chunk.

In 211, a list of most frequently used chunks may be determined based on the data indicating the number and/or type of accesses to each chunk. In various embodiments, the list of most frequently used chunks may be determined at various times with respect to the monitoring and storage performed in 207 and 209. For example, the list of most frequently used chunks may be determined or updated concurrently as the chunk accesses are being monitored or may be determined after the monitoring of chunk accesses has been completed. In one embodiment, chunk accesses may be monitored for a particular monitoring period, as described above, and the list of most frequently used chunks may be determined after the monitoring period has ended and using the access data stored during the monitoring period.

In 213, the most frequently used chunks may be balanced across the plurality of disks, e.g., a portion of the chunks located on heavy disks may be moved to light disks, as described above. In various embodiments, any kind of balancing algorithm may be utilized to balance the most frequently used chunks across the plurality of disks. One embodiment of such an algorithm is described below with reference to FIG. 5. In one embodiment, the GUI displayed in 201 may also allow the user to specify properties affecting the balancing algorithm or affecting which chunks are relocated to different disks.

As described above and as indicated by the flowchart arrow returning from 213 to 207, in one embodiment the monitoring of chunk accesses, the determination of the most frequently used chunks, and the balancing of the most frequently used chunks may be performed repeatedly. Various techniques may be used to control the timing with which these tasks occur. For example, in one embodiment, a new monitoring period may begin as soon as the current one ends. Thus, as the most frequently used chunks are being balanced based on access data from the last monitoring period, new access data may be gathered simultaneously. In another embodiment, the new monitoring period may not begin until balancing of the most frequently used chunks based on access data from the last monitoring period has completed. In another embodiment, monitoring periods may be set to begin at periodic intervals. For example, the user may specify the desired time interval via the GUI in 203. In this embodiment, no monitoring or balancing activity may occur until the next monitoring period is set to start.

The monitoring and balancing of most frequently used chunks may continue until a condition or event occurs to cause their termination. For example, in one embodiment, the user may request balancing of the most frequently used chunks to stop via the GUI displayed in 201. In another embodiment, a program may utilize an application programming interface (API) to request the balancing to stop. In another embodiment, the monitoring and balancing of most frequently used chunks may not occur repeatedly but may only be performed a single time.

As noted above, FIG. 3 represents one particular embodiment of a method for balancing most frequently used chunks, and various elements of FIG. 3 may be altered, combined, omitted, or performed in different orders in other embodiments. For example, in another embodiment, the GUI may not be displayed in 201. For example, the system may be configured to automatically monitor and balance the most frequently used chunks using fixed properties, and the user may not be able to adjust the properties via a GUI, or the properties may be set using other techniques, such as by a computer program performing one or more API calls to set the properties programmatically.

As another example, in the above described embodiment, the balancing algorithm is automatically performed after the most frequently used chunks have been determined. In another embodiment, the method may not automatically perform the balancing algorithm after the most frequently used chunks have been determined, but may instead seek user approval. As described below, for example, data may be displayed to indicate which chunks will be relocated to different storage devices, indicate what the physical layout of the most frequently used chunks will be after the balancing algorithm has been performed, etc. Thus, the user may decide to either accept the proposed balancing and request the system to proceed or may cancel the proposed balancing, e.g., in order to set different properties of the monitoring and balancing, such as a different chunk size or a different list size for the list of most frequently used chunks. In another embodiment, the user may modify the proposed balancing, e.g., by providing user input to manually specify that certain chunks not be relocated, to specify a different disk for chunks to be relocated to instead of the suggested ones, etc.

Multiple Volumes

As described above, in one embodiment the plurality of disks may be organized into multiple volumes. In one embodiment, data regarding most frequently used chunks for all volumes on the disks may be considered together when balancing chunks across the disks. This may enable the input/output load for the disks to be balanced better than if the most frequently used chunks in each volume were balanced independently of each other. Thus, in one embodiment monitoring may be turned on/off for the entire set of volumes that reside on the plurality of disks, e.g., as opposed to turning monitoring on/off for volumes independently of each other. However, in another embodiment, monitoring of individual volumes may be turned on/off independently of each other, and the most frequently used chunks in each volume may be balanced independently of each other if desired. Also, in one embodiment, monitoring may be turned on/off for the entire set of volumes, but the user may specify one or more individual volumes to exclude from monitoring/balancing.

In one embodiment, the user may be able to specify different monitoring properties for each volume, e.g., may specify different chunk sizes for each volume or different sizes for the list of most frequently used chunks determined for each volume. In one embodiment there may be a single monitoring period which applies to all volumes.

In one embodiment, data indicating the access statistics for each volume may be stored in separate data structures. For example, each volume may have its own list and/or hash table in which access statistics for chunks in the volume are stored. In another embodiment, there may be a single data structure that stores access statistics for all chunks, regardless of the volume with which the chunk is associated.

The balancing algorithm may take the most frequently used chunk data for all monitored volumes into account when determining how to balance chunks across the disks. In one embodiment, each volume may be given equal weight in the balancing algorithm. In other embodiments, the weight given to each volume may vary depending on such factors as the size of the most frequently used chunk list for each volume, the chunk size for each volume, the relative access statistics for the most frequently used chunks in each volume, etc. In one embodiment, the balancing algorithm may act to ensure that for each volume, the most frequently used chunks in the volume are balanced across the disks. In another embodiment, the balancing algorithm may ensure only that the entire set of most frequently used chunks for all the volumes is balanced across the disks, and may allow the most frequently used chunks for one or more individual volumes to remain unbalanced.

Displaying Most Frequently Used Chunk Data

Various embodiments may also include the ability to display data relating to the most frequently used chunks. For example, the GUI such as described above with reference to FIG. 3 may be operable to display most frequently used chunk data in addition to allowing the user to specify properties of the monitoring and/or balancing. In another embodiment, a separate tool or GUI may be utilized to display this data.

Any kind of data relating to the most frequently used chunks may be displayed, and the data may be visually presented in any way. Exemplary techniques for displaying the data may include displaying text and/or graphical information, displaying icons or other pictures, displaying color coded information, etc.

In one embodiment, the displayed data may include data indicating access statistics for the most frequently used chunks (and possibly other chunks that are not designated as most frequently used chunks). For example, the displayed data may indicate the number of accesses (read and/or write accesses) received to the chunks over one or more monitoring periods or may indicate access statistics for different chunks relative to each other. In one embodiment the displayed data may also indicate which of the most frequently used chunks were relocated to different disks and/or may indicate the number of most frequently used chunks that were moved (or not moved).

In one embodiment, the displayed data may indicate a mapping of chunks to physical disk locations (or physical locations on other types of storage devices). This mapping may be indicated using text and/or graphical information. For example, in one embodiment a graphical map of the physical disk surfaces or a conceptual representation of the physical disks may be displayed, and the chunk locations (most frequently used chunks and/or other chunks) may be indicated on the graphical map. In one embodiment, a mapping of the most frequently used chunks to their original disk locations may be displayed. In addition, or alternatively, a mapping of the most frequently used chunks to their new disk locations after the balancing algorithm has been performed may also be displayed.

In an embodiment in which the disks or other storage devices are organized into multiple volumes such as described above, the displayed data may include data relating to each of the volumes. For example, in one embodiment, access statistics for chunks in each volume may be displayed separately, and the user may be able to view separate graphical maps for each volume to indicate the mapping of chunks in the volume to physical storage locations, etc. In one embodiment, the user may be able to select from different views to cause data pertaining to different volumes to be displayed together or separately, or the user may be able to specify a grouping of volumes so that data for all volumes in the specified group is displayed together.

In one embodiment the data relating to the most frequently used chunks may be displayed after the most frequently used chunks have been balanced across the plurality of storage devices. For example, the user (e.g., a system administrator) may review the data to understand how many chunks were relocated to different disks over various monitoring periods, understand the physical layout of most frequently used chunks on each disk, etc. The user may then adjust properties of the monitoring and/or balancing to better optimize the system if necessary.

As described above, in one embodiment, the balancing algorithm may not be performed automatically after the most frequently used chunks have been determined; instead, the user may be prompted for approval before the balancing algorithm is performed. In this embodiment, the data relating to the most frequently used chunks may be displayed to inform the user of how the balancing will be performed. As described above, the user may choose to accept, cancel, or modify the proposed balancing.

Figure 4:
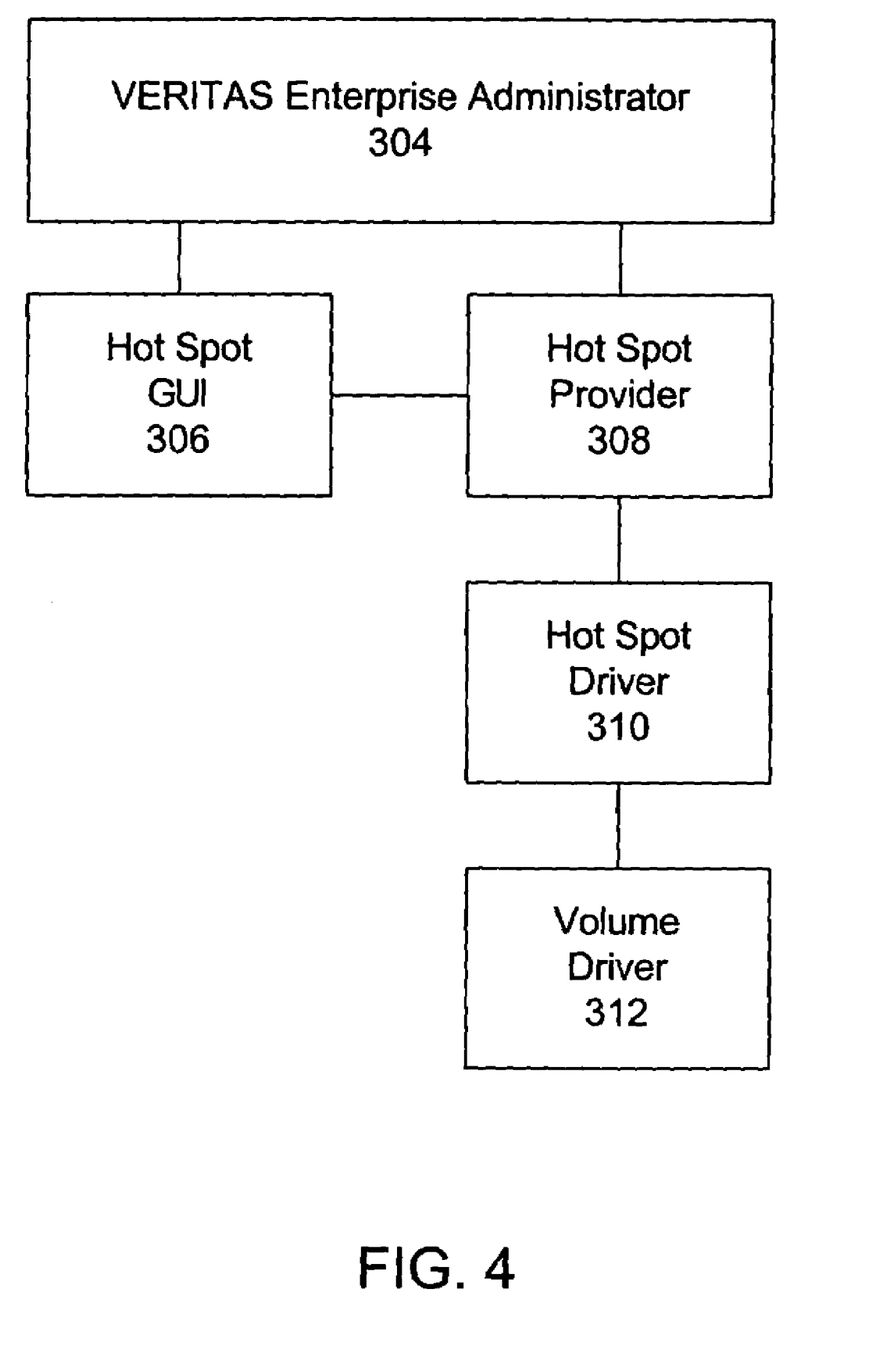
FIG. 4 is a diagram illustrating an exemplary software architecture for a system operable to balance most frequently used chunks across a plurality of storage devices.

FIG. 4—Exemplary Software Architecture

FIG. 4 is a diagram illustrating an exemplary software architecture for a system operable to balance most frequently used chunks in the manner described above. This example illustrates an architecture based on storage systems provided by VERITAS Software Corporation. However, it is noted that FIG. 4 is intended as an example only, and in various embodiments, the methods described above can be used in conjunction with any of various kinds of storage systems and can be implemented using any desired software architecture.

FIG. 4 illustrates a Volume Driver 312. The Volume Driver 312 may be responsible for handling input/output requests for chunks or clusters in a given volume. As shown, a Hot Spot Driver 310 may interface with the Volume Driver 312. The Hot Spot Driver 310 may reside "on top of" the Volume Driver 312 such that input/output requests for chunks or clusters in a volume are first received by the Hot Spot Driver 310. Thus, the Hot Spot Driver 310 may be responsible for monitoring input/output requests (read/write accesses) for the chunks and storing data indicating the accesses to each chunk, as described above with reference to 207 and 209 of FIG. 3. The Hot Spot Driver 310 may perform this monitoring and storage for each input/output request if monitoring is currently turned on or enabled (e.g., as described above with reference to 205 of FIG. 3). Each input/output request may be passed from the Hot Spot Driver 310 to the Volume Driver 312 so that the Volume Driver 312 can fulfill the input/output request. If monitoring is not currently turned on, then the Hot Spot Driver 310 may simply pass each input/output request to the Volume Driver 312 without monitoring or storing data regarding the request.

In one embodiment, when monitoring is turned on, a thread in the Hot Spot Driver 310 may be operable to record each received input/output request for a chunk in a queue. For example, the queue may comprise a plurality of entries, where each entry specifies the type of the respective input/output request (e.g., read or write request) and the chunk number accessed by the request. One or more separate threads may process each entry in the queue to store data indicating the accesses to each chunk. As described above, this data may be stored in any of various kinds of data structures.

In one embodiment, a hash table keyed by chunk number may be utilized. For each entry in the queue, a hash table lookup on the chunk number may be performed to find an entry for the respective chunk number. If an entry for the chunk number is not found, a new entry for the chunk number may be added to the hash table. Each hash table entry may specify the current access count (or the current access counts for each type of access, e.g., read access count and write access count) for the respective chunk number. Thus, the new entry may have an initial access count of 1. In one embodiment, a new list item for the chunk number may also be added to the tail of a most frequently used (MFU) list. The MFU list may comprise a sorted list of the most frequently accessed chunks in a volume. If the MFU list is already full (e.g., if a maximum list size has already been reached) then one or more members may be removed from the tail of the MFU list to make room for the new list item.

If a hash table entry for the chunk number is found when the hash table lookup is performed, the access count for the entry may be incremented by one. If appropriate, the corresponding list item for the chunk number may also be moved up in the MFU list (e.g., if the increase in the access count causes the list item to have a greater access count than the next item in the MFU list.) Thus, in this embodiment the MFU list may be continuously updated as input/output requests are received and processed from the queue. As noted above, in another embodiment, the MFU list may be computed after all input/output requests for the monitoring period have been received and processed.

FIG. 4 also illustrates a Hot Spot Provider 308 that interfaces with the Hot Spot Driver 310. The Hot Spot Provider 308 is a provider for VERITAS Enterprise Administrator (VEA) 304. The Hot Spot Provider 308 allows clients such as the Hot Spot GUI 306 and CLI tools to manage the monitoring of most frequently used chunks. The Hot Spot Provider 308 may provide access for remote clients and handle multiple clients monitoring the same volume. Functionality of the Hot Spot Provider 308 may include: encapsulating interface calls (e.g., IOCTL calls) to the Hot Spot Driver 310, handling remote client access, periodically obtaining data regarding the most frequently used chunks, and signaling an event when a set of data regarding most frequently used chunks is available.

When monitoring is turned on, the Hot Spot Provider 308 may be operable to periodically obtain or receive a new set of monitoring data for all volumes from the Hot Spot Driver 310 for each monitoring period. In one embodiment, each time a new set of monitoring data is received, the Hot Spot Provider 308 may signal an event. For example, one or more threads may be registered to receive the event so that they can process the monitoring data. For example, one or more threads may begin balancing most frequently used chunks across the disks, based on the monitoring data. As another example, a GUI client may display each new set of monitoring data.

In one embodiment, the Hot Spot Provider 308 may provide an interface that includes the following methods:

CREATE: Used to initialize monitoring and set monitoring properties for a volume such as chunk size, MFU list size, monitoring period, etc.

START: Used to request monitoring for a volume to start.

STOP: Used to request monitoring for a volume to stop.

GET_BUFFER: Used to get a buffer that stores data regarding most frequently used chunks in a volume.

DUMP: Used to dumb a buffer that stores data regarding most frequently used chunks to a file.

QUERY: Used to query the monitoring status of a volume.

DESTROY: Used to un-initialize or destroy data structures used in monitoring a volume.

These methods may be exposed to clients such as the Hot Spot GUI 306 and CLI tools. For example, the Hot Spot GUI 306 may comprise a GUI such as described above with reference to 201, 203, and 205 of FIG. 3. Thus, the Hot Spot GUI 306 may receive user input specifying properties of the monitoring and call the CREATE method of the Hot Spot Provider 308 to initialize monitoring and set monitoring properties for a volume. The Hot Spot Provider 308 may interface with the Hot Spot Driver 310 to cause the Hot Spot Driver 310 to use the specified monitoring properties when performing monitoring for the volume. The Hot Spot GUI 306 may also call the START method of the Hot Spot Provider 308 to request monitoring for the volume to start. Similarly, the Hot Spot GUI 306 may call the GET_BUFFER method of the Hot Spot Provider 308 to get data regarding most frequently used chunks in a volume, e.g., so that the data can be processed for display to the user, as described above.

In various embodiments, the algorithm to perform the actual balancing of most frequently used file system chunks or clusters may be performed by any of various software programs or components, e.g., depending on the particular software architecture of the system. In one embodiment, the balancing algorithm may be performed by the Hot Spot Provider 308. In one embodiment, the Hot Spot Provider 308 may perform file system calls to perform the actual file system cluster relocation. The file system may provide methods or functions that encapsulate the file cluster relocation so that no data corruption occurs during the relocation process. For file system clusters to be moved, file handle and virtual cluster numbers corresponding to the logical cluster numbers may be obtained. Using this information, the file system clusters may be moved to available free space as determined by the analysis described above. Continuous file system clusters may be moved using a single file system call if possible.

Thus, the file system may effectively be told how to re-organize itself by software that monitors data access at the chunk or cluster level so that most frequently used chunks or clusters can be rapidly accessed.

The elements shown in FIG. 4 may be stored on or may be executed on any of various computer systems, including one or more of the computer systems shown in FIG. 1 or other computer systems. In one embodiment, the Hot Spot GUI 306 may execute on or may be displayed on a client computer system 102. The Hot Spot Provider 308 may execute on the same computer as the Hot Spot GUI 306 or may execute on another computer, e.g., a server computer such as shown in FIG. 1. For example, the Hot Spot GUI 306 may communicate with the Hot Spot Provider 308 via the network. The Hot Spot Driver 310 and Volume Driver 312 may execute on the same computer as the Hot Spot Provider 308 or on different computers. Also, portions of these programs may be distributed across and may execute on multiple computers.

Figure 5:
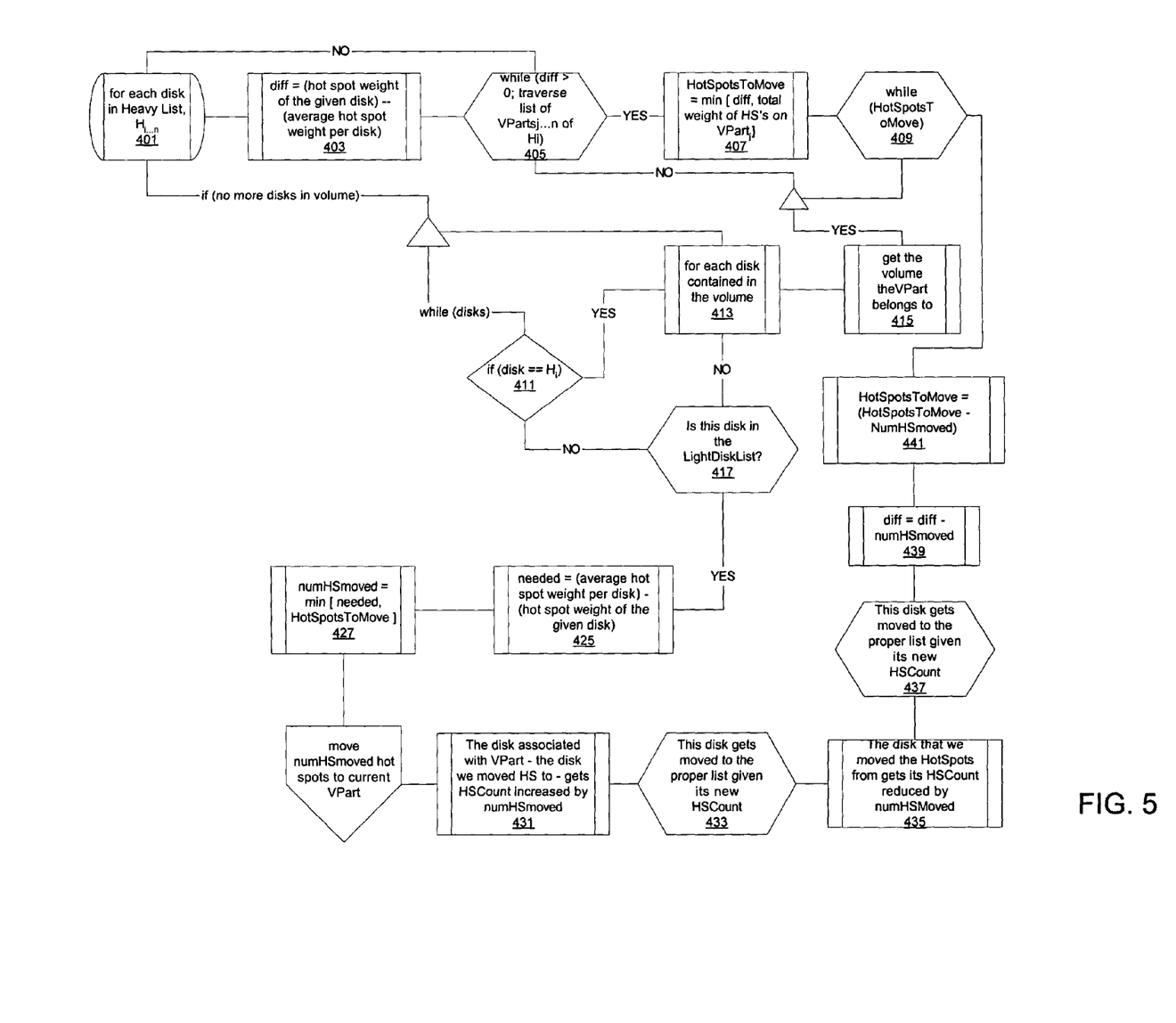
FIG. 5 is a flowchart diagram illustrating one exemplary embodiment of a balancing algorithm.

FIG. 5—Exemplary Balancing Algorithm

As described above, in various embodiments, any kind of balancing algorithm may be used to balance most frequently used chunks or clusters across a group of disks or other storage devices. Balancing the most frequently used chunks or clusters may comprise relocating one or more chunks or clusters to different disks in accordance with the following: for each of one or more disks, increase or decrease the number of most frequently used chunks or clusters on the disk to a number closer to the average number of most frequently used chunks or clusters for all disks.

In one embodiment, the balancing algorithm may operate to ensure that most frequently used chunks are distributed across the disks as evenly as possible. In other embodiments, the balancing algorithm may simply operate to cause the most frequently used chunks to become more balanced (not necessarily fully balanced) across the disks. Also, the balancing algorithm may not only take into account the simple number of most frequently used chunks on each disk, but may also weight the most frequently used chunks based on their access counts. Thus, these weights may be taken into account when balancing the most frequently used chunks across the disks.

In one embodiment, for each volume, the balancing algorithm may examine the monitoring data to determine the logical cluster numbers of the chunks in the most frequently used list. The logical cluster numbers may be determined based on the chunk numbers and the chunk size. The logical cluster numbers may be mapped to physical disks using volume layout information (e.g., plexes, subdisks, and disks). The hot spot weight of each disk in the plurality of disks may be calculated using the logical cluster numbers, access count of these logical cluster numbers, and the volume-to-disk mapping information.

If the hot spot weights of the disks are not balanced, some of the most frequently used chunks or clusters on heavy disks (i.e., disks with a greater hot spot weight than average) may be relocated to light disks (i.e., disks with a smaller hot spot weight than average). To analyze the cluster relocation, the heavy disks and their most frequently used chunks or clusters may be enumerated to find file system clusters to be moved based on average hot spot weight of the disk group. The light disks may also be enumerated to calculate which disk the most frequently used chunks or clusters should move to based on the volume layout, available free space in a volume, and hot spot weight of disks so that all disks will have balanced input/output load.

As noted above, in one embodiment, disk geometry may be taken into account when moving chunks or clusters. For example, most frequently used chunks or clusters may not only be moved from heavy disks to light disks, but may also be moved to optimal locations on the lights disks, e.g., to locations near the center of the light disks, in order to achieve faster access times. In one embodiment, in choosing a disk to which to move most frequently used chunks or clusters, the amount of optimally positioned free space that the disk has (e.g., the amount of free space near the center of the disk) may be taken into account. For example, suppose there are two light disks, Disk A and Disk B, where Disk A has free space near its center that can hold one or more clusters of data, and Disk B does not have free space near its center. In this example, Disk A may be chosen over Disk B as the disk to which to move one or more frequently used chunks or clusters. In one embodiment, if free space near the center of a light disk is not available, one or more chunks or clusters that are not most frequently used chunks or clusters may be moved to a different position on the light disk or to a different disk so that most frequently used chunks or clusters can be moved near the center of the light disk.

FIG. 5 illustrates one exemplary embodiment of a balancing algorithm. In 401, each heavy disk may be enumerated. For each heavy disk, a diff value may be calculated in 403 as the difference of the hot spot weight of the heavy disk minus the average hot spot weight per disk. While this diff value is greater than 0, a list of VParts for the heavy disk is traversed in 405. In 407 a HotSpotsToMove value is calculated as the minimum of the diff value and the total weight of hot spots on the current VPart. As shown in 409, while HotSpotsToMove is greater than 0, the volume that the current VPart belongs to may be determined in 415. In 413, each disk in the volume may be enumerated. As shown in 411, if the current disk is not the current heavy disk (from 401) then in 417, the algorithm determines whether the current disk is a light disk. If so, then in 425 a needed value is calculated as the difference of the average hot spot weight per disk minus the hot spot weight of the given disk. In 427, a numHSmoved value is calculated as the minimum value of needed and HotSpotsToMove. As shown, numHSMoved hot spots (i.e., most frequently used chunks or clusters) are then moved to the current VPart. As shown in 431, the disk associated with VPart (i.e., the disk the hot spots were moved to) gets its HSCount increased by numHSMoved. In 433, this disk is moved to the appropriate list (i.e., heavy disk list or light disk list), based on its new HSCount. In 435, the disk that the hot spots were moved from gets its HSCount reduced by numHSMoved. In 437, this disk is moved to the appropriate list (i.e., heavy disk list or light disk list), based on its new HSCount. In 439, diff is re-calculated as diff−numHSmoved. In 441, HotSpotsToMove is re-calculated as HotSpotsToMove−numHSMoved. For 441, the flow returns to the while condition in 409.

Various embodiments may further include receiving, sending or storing instructions and/or data that implement a storage configurator in accordance with the foregoing description upon a carrier medium. Generally speaking, a carrier medium may include a memory medium as defined above, as well as transmission media or signals such as electrical, electromagnetic, or digital signals, conveyed via a communication medium such as network and/or a wireless link.

Various modifications and changes may be made to the invention as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer-readable memory medium comprising program instructions executable to:
    monitor accesses to chunks located on a plurality of storage devices, wherein each chunk comprises one or more file system clusters;
    store data indicating a number of accesses to each chunk;
    receive user input specifying a size N for a list of most frequently used chunks;
    determine the list of N most frequently used chunks based on the data indicating the number of accesses to each chunk; and balance the N most frequently used chunks across the plurality of storage devices.

2. The computer-readable memory medium of claim 1, wherein the plurality of storage devices comprises a plurality of disks.

3. The computer-readable memory medium of claim 1, wherein one or more volumes are stored on the plurality of storage devices; and
wherein said monitoring accesses to chunks located on the storage devices comprises, for each volume, monitoring accesses to chunks located in the volume.

4. The computer-readable memory medium of claim 1, wherein the program instructions are further executable to:
display a graphical user interface for controlling said monitoring; and
receive user input to the graphical user interface requesting to start said monitoring;
wherein said monitoring accesses to chunks located on the storage devices is performed in response to the user input requesting to start said monitoring.

5. The computer-readable memory medium of claim 1, wherein the program instructions are further executable to:
display a graphical user interface for setting properties of said monitoring; and
receive user input to the graphical user interface specifying one or more properties of said monitoring;
wherein said monitoring accesses to chunks located on the storage devices is performed in accordance with the specified one or more properties.

6. The computer-readable memory medium of claim 1, wherein said monitoring accesses to chunks located on the storage devices comprises one or more of:
monitoring read accesses to the chunks; and/or
monitoring write accesses to the chunks.

7. The computer-readable memory medium of claim 1, wherein the program instructions are further executable to:
display information indicating the number of accesses to each chunk.

8. The computer-readable memory medium of claim 1, wherein said balancing the most frequently used chunks across the plurality of storage devices comprises, for each of at least a subset of chunks in the list of most frequently used chunks, relocating file system clusters in the chunk to a different storage device in the plurality of storage devices.

9. The computer-readable memory medium of claim 1, wherein said balancing the most frequently used chunks across the plurality of storage devices includes relocating a first file system cluster from a first storage device to a second storage device;
wherein the program instructions are further executable to determine a first location on the second storage device to which to relocate the first file system cluster;
wherein said relocating the first file system cluster from the first storage device to the second storage device comprises relocating the first file system cluster to the first location on the second storage device.

10. The computer-readable memory medium of claim 9, wherein said determining the first location on the second storage device to which to relocate the first file system cluster comprises determining a location on the second storage device at which the first file system cluster can be accessed rapidly.

11. The computer-readable memory medium of claim 9, wherein the second storage device comprises a disk;
wherein said determining the first location on the second storage device comprises determining a location near the center of the disk;
wherein said relocating the first file system cluster to the first location on the second storage device comprises relocating the first file system cluster to the location near the center of the disk.

12. A computer-readable memory medium comprising program instructions executable to:
receive user input specifying a chunk size, wherein the chunk size specifies a number of bytes;
monitor accesses to chunks of the specified chunk size located on a plurality of storage devices;
store data indicating a number of accesses to each chunk;
determine a list of most frequently used chunks based on the data indicating the number of accesses to each chunk; and
balance the most frequently used chunks across the plurality of storage devices.

13. The computer-readable memory medium of claim 12, wherein the plurality of storage devices comprises a plurality of disks.

14. The computer-readable memory medium of claim 12, wherein a plurality of volumes are stored on the plurality of storage devices;
wherein the program instructions are further executable to receive user input specifying a chunk size for each volume;
wherein said monitoring accesses to chunks of the specified chunk size located on the storage devices comprises, for each volume, monitoring accesses to chunks located in the volume and having the specified chunk size for the volume.

15. The computer-readable memory medium of claim 12, wherein said monitoring accesses to chunks located on the storage devices comprises one or more of:
monitoring read accesses to the chunks; and/or
monitoring write accesses to the chunks.

16. The computer-readable memory medium of claim 12, wherein said balancing the most frequently used chunks across the plurality of storage devices comprises, for each of at least a subset of chunks in the list of most frequently used chunks, relocating file system clusters in the chunk to a different storage device in the plurality of storage devices.

17. A system comprising:
one or more processors; and
a plurality of storage devices;
wherein the one or more processors are operable to execute program instructions to:
monitor accesses to chunks located on the storage devices, wherein each chunk comprises one or more file system clusters;
store data indicating a number of accesses to each chunk;
receive user input specifying a size N for a list of most frequently used chunks;
determine the list of N most frequently used chunks based on the data indicating the number of accesses to each chunk; and
balance the N most frequently used chunks across the plurality of storage devices.

18. The system of claim 17, wherein the plurality of storage devices comprises a plurality of disks.

19. The system of claim 17,
wherein one or more volumes are stored on the plurality of storage devices; and
wherein said monitoring accesses to chunks located on the storage devices comprises, for each volume, monitoring accesses to chunks located in the volume.

20. The system of claim 17, wherein the one or more processors are further operable to execute the program instructions to:
display a graphical user interface for controlling said monitoring; and
receive user input to the graphical user interface requesting to start said monitoring;
wherein said monitoring accesses to chunks located on the storage devices is performed in response to the user input requesting to start said monitoring.

21. The system of claim 17, wherein the one or more processors are further operable to execute the program instructions to:
display a graphical user interface for setting properties of said monitoring; and
receive user input to the graphical user interface specifying one or more properties of said monitoring;
wherein said monitoring accesses to chunks located on the storage devices is performed in accordance with the specified one or more properties.

22. The system of claim 17,
wherein said monitoring accesses to chunks located on the storage devices comprises one or more of:
monitoring read accesses to the chunks; and/or
monitoring write accesses to the chunks.

23. The system of claim 17,
wherein the one or more processors are further operable to execute the program instructions to display information indicating the number of accesses to each chunk.

24. The system of claim 17,
wherein said balancing the most frequently used chunks across the plurality of storage devices comprises, for each of at least a subset of chunks in the list of most frequently used chunks, relocating file system clusters in the chunk to a different storage device in the plurality of storage devices.

25. The system of claim 17,
wherein said balancing the most frequently used chunks across the plurality of storage devices includes relocating a first file system cluster from a first storage device to a second storage device;
wherein the one or more processors are further operable to execute the program instructions to determine a first location on the second storage device to which to relocate the first file system cluster;
wherein said relocating the first file system cluster from the first storage device to the second storage device comprises relocating the first file system cluster to the first location on the second storage device.

26. A system comprising:
one or more processors; and
a plurality of storage devices;
wherein the one or more processors are operable to execute program instructions to:
receive user input specifying a chunk size, wherein the chunk size specifies a number of bytes;
monitor accesses to chunks of the specified chunk size located on a plurality of storage devices;
store data indicating a number of accesses to each chunk;
determine a list of most frequently used chunks based on the data indicating the number of accesses to each chunk; and
balance the most frequently used chunks across the plurality of storage devices.

27. The system of claim 26,
wherein the plurality of storage devices comprises a plurality of disks.

28. The system of claim 26,
wherein said monitoring accesses to chunks located on the storage devices comprises one or more of:
monitoring read accesses to the chunks; and/or
monitoring write accesses to the chunks.

29. The system of claim 26,
wherein said balancing the most frequently used chunks across the plurality of storage devices comprises, for each of at least a subset of chunks in the list of most frequently used chunks, relocating file system clusters in the chunk to a different storage device in the plurality of storage devices.

* * * * *